United States Patent [19]

Skrmetta

[11] 3,971,102

[45] July 27, 1976

[54] SHRIMP PEELER ROLLER SYSTEM

[76] Inventor: Raphael Q. Skrmetta, 4610 Press Drive, New Orleans, La. 70126

[22] Filed: Nov. 7, 1974

[21] Appl. No.: 521,785

[52] U.S. Cl. .......................................... 17/73; 17/48
[51] Int. Cl.² .................................................... A22C 29/00
[58] Field of Search ................. 17/73, 72, 71, 45, 48

[56]  References Cited
UNITED STATES PATENTS

| | | | |
|---|---|---|---|
| 2,781,544 | 2/1957 | Skrmetta................................ | 17/73 |
| 2,960,719 | 11/1960 | Merrick .................................. | 17/72 |
| 3,143,761 | 8/1964 | Welcker et al. ......................... | 17/73 |

*Primary Examiner*—Warner H. Camp
*Attorney, Agent, or Firm*—Pugh & Keaty

[57]  ABSTRACT

A specially designed roller for shrimp peeling machines which includes a gapped portion along its length, for example at its upper end, to effectively shorten the effective peeling section of the machine without substantial modification of the basic machine itself by allowing the shrimp to fall through the gapped portion rather than traversing the full length of the roller. Heretofore, separate, different machines were necessary to achieve the highly desired advantages of the present invention. The special, gapped rollers are substituted for the standard peeling rollers which provide peeling action along their full length, when an effectively shorter peeling section is desired. Several different gapped rollers are disclosed, some reversible end-for-end and others forming a series of subsequently related rollers which have a varying location of the gap portion along the roller length.

9 Claims, 4 Drawing Figures

STANDARD, PRIOR ART ARRANGEMENT

SHRIMP PEELER ROLLER SYSTEM

BACKGROUND OF THE INVENTION

The present invention relates to shrimp peeling machines for peeling shrimp, including both pre-cooked and raw shrimp, and is more particularly directed to a special gapped roller system which allows the amount of effective peeling action of a shrimp peeling machine to be easily changed.

The present invention further relates especially to a shrimp peeling apparatus developed for the bulk processing of Pandalus Borealis specie of shrimp, but may prove efficacious for other species of shrimp, and is more particularly directed to shrimp peeling machines which peel shrimp by the action of at least two oscillating mating rollers rotating in alternating opposite directions, the shrimp being supported on the rollers and being peeled along the length of the rollers by means of the shells being pinched between the rollers as the shrimp move down the rollers. Prior art machines using such a peeling action normally include a parallel bank of such rollers laterally disposed across the width of the machines and usually had two or more peeling sections, one section leading into the next.

For 25 years shrimp peeling machines identical or similar to that disclosed in U.S. Pat. No. 2,778,055 (issued Jan. 22, 1957) have been used for peeling raw shrimp. In more recent years shrimp peeling machines identical or similar to that disclosed in U.S. Pat. No. 3,383,734 (issued May 21, 1968) have been used especially for peeling precooked shrimp. Other shrimp peeling machines have also been developed and commercially used. These various types of prior art shrimp peeling machines had various lengths of rollers in the machines and hence had correspondingly various lengths or amounts of peeling action. However, the length of the peeling action was set and fixed in each machine and could not be readily varied.

Hence, heretofore, different, separate machines were needed for different type shrimp which required different lengths or amounts of peeling action. Additionally, even in machines designed to handle a specific type of shrimp, conditions were found to vary. Thus for example, in the first or upper peeling section of the shrimp peeling machine of the type shown in U.S. Pat. No. 2,778,055, the inventor has found that shrimp peeled much better when the machine is operated with a slow steady feed, but, in the ordinary, rushed operation of the shrimp peeling machine of both the raw shrimp peeling machine and the precooked shrimp peeling machine, there are considerable amounts of partially peeled shrimp and a considerable number of whole shrimp that have not had any peeling action at all. It has been further found that those Pandalus Borealis specie of shrimp that are totally unpeeled when they advance to the second or lower section of rollers, a considerable volume of the shrimp with all the shells still on are crushed and totally destroyed through the rollers in the prior art machines.

Moreover, some shrimp that are completely peeled in the first section and advanced to the second section are then considerably over-peeled, broken and partially destroyed, leaving the quality of the shrimp less than desired in the prior art machines.

Indeed, it has been found that, when the shrimp peeling machines are run with the proper input feed of precooked Pandalus Borealis species, the second section is not needed for all shrimp during the various seasons of the year. For example, the summer shrimp run in the northeastern states of the United States of the Pandalus Borealis specie is peeled completely in the first section of the machine. At other times of the year, the lower rollers of the section, although needed, if they could be modified to one-half or less of their fixed length, would give a superior peeling job, with more yield, less broken and mutilated shrimp, making a better product and an economical gain for the operator.

The present invention allows the standard, prior art peeling machines to be quickly converted with the special gapped roller change part of the present invention to lessen the total length of peeling action and to perform as good as and better than machines custom designed for that peeling action length. A further object of the present invention is to provide an apparatus which requires much less water than is needed for processing shrimp by conventional bulk fed peeling machines having approximately the same capacity in pounds of shrimp per hour.

A still further object of the present invention is to provide an apparatus which is especially efficacious for peeling precooked Pandalus Borealis shrimp and with the simple change part of the present invention be converted to peel raw Pandalus Borealis shrimp and all other species of shrimp.

Still a further object of the present invention is to utilize existing machines to prevent economic loss to the owners so that, with the insertion of the special gapped rollers of the present invention, all machines can be quickly set or converted to the very maximum performance for all the shrimp species, both raw and precooked.

It has also been found that substantial savings of water is effected when employing the special gapped rollers of the present invention inserted into the machine, with substantially better results as to the quality of the peeling job done in both sections and also with production of shrimp of higher yield.

BRIEF DESCRIPTION OF THE DRAWINGS

For a better understanding of the nature and objects of the invention, reference should be had to the following drawings, taken in conjunction with the detailed description thereof. In the drawings, synonymous reference numerals are employed throughout in the various views to refer to identical components.

DESCRIPTION OF THE PREFERRED EMBODIMENTS

Figure 1:
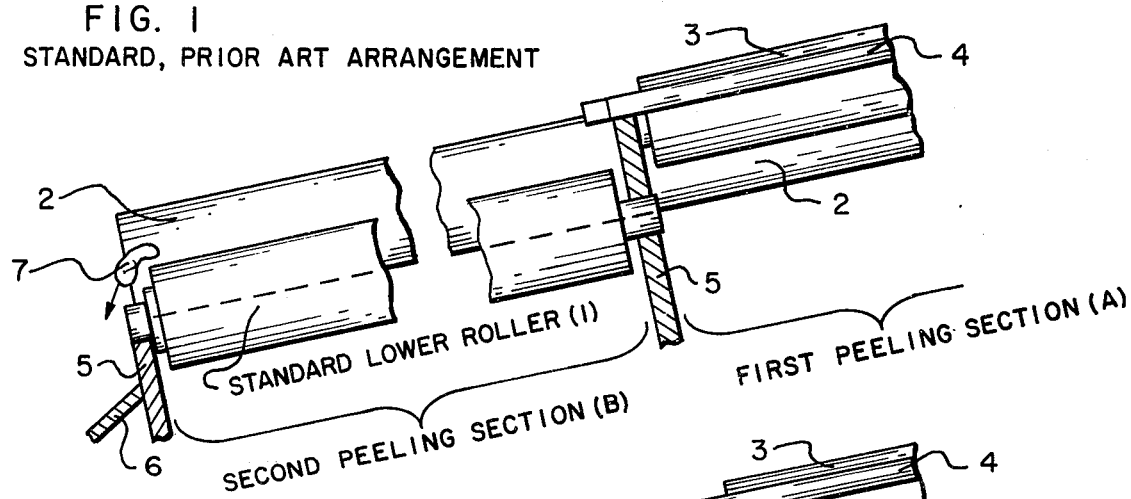
FIG. 1 is a side fragmentary view of a standard peeling section of a shrimp peeling machine with parts broken away to show the regular prior art, standard lower roller and is similar in content and perspective to FIG. 12 of the aforementioned prior U.S. Pat. No. 2,778,055.

Referring now to FIG. 1, the standard prior art peeling machine includes an insert roller 4 mating with an upper peeling roller 3 in the first or upper peeling section A. Mounted along with the upper roller 3 in the first peeling section and continuing down on through the peeling machine is the main power roller 2, which operates also in the second or lower peeling section B with the lower roller 1. All of the rollers 1–4 are mounted on and supported by a basic frame 5, and the lower and upper rollers 1,3 engage the surface of the main power roller 2 which drives all the rollers in the peeling section by the face-to-face mating therewith. These rollers 1,2 and 2,3 oscillate in alternating opposite directions at a controlled degree of oscillation in the second peeling section B, allowing shrimp which are supported on the rollers to continue down along the oscillating rollers to be peeled by the pinching action of the rollers and discharged at the lower end of the rollers 1,2 and out of the machine into suitable means such as trough baffle 6 (note shrimp 7 of FIG. 1). For a further understanding of the operation and structure of the typical prior art shrimp peeling machine reference is had to the aforementioned U.S. Pat. Nos. 2,778,055 and 3,383,734.

Figure 2:
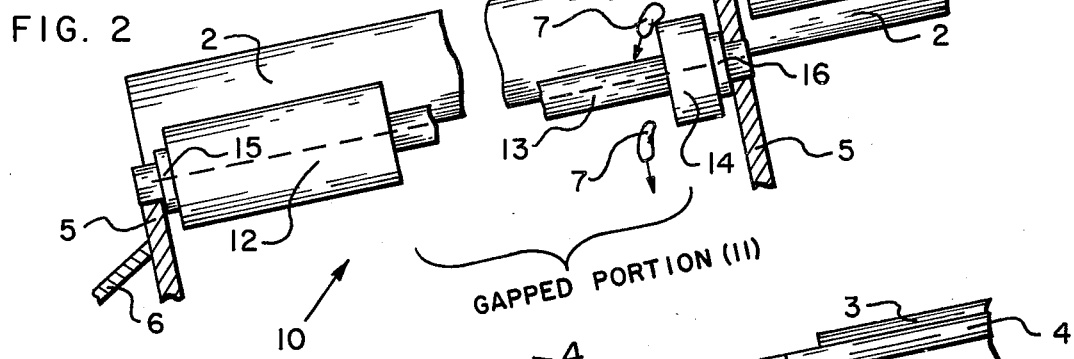
FIG. 2 is a side fragmentary view of the peeling section of the machine of FIG. 1 with parts broken away to show the gapped roller of the present invention inserted in place of the standard lower roller with the gapped portion at the top, upstream end of the section to allow the second section to be totally inoperative from a peeling standpoint.

FIG. 2 shows the same machine as described above with respect to FIG. 1 but with the special gapped roller 10 of the present invention inserted in place of the regular lower roller 1 shown in FIG. 1. The presence of the gapped roller structure 10 allows the shrimp 7 that had progressed through the first peeling section to be discharged through the gapped portion 11 of the special gapped roller 10 to an appropriate means such as a flume (not illustrated) to carry the shrimp away. In the roller disposition illustrated in FIG. 2, the gapped portion 11 is located at the upstream end of the second peeling section B.

Figure 3:
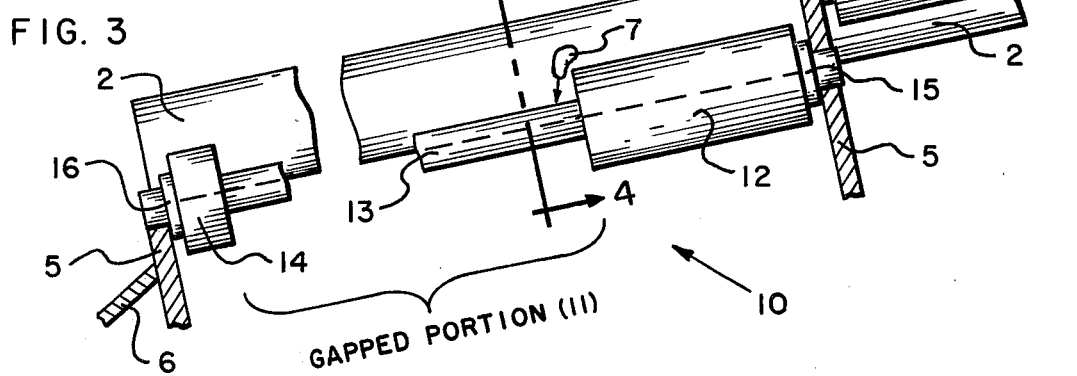
FIG. 3 is a side fragmentary view of the peeling section of the machine of FIG. 1 with parts broken away to show the special gapped roller of the present invention inserted with the gapped portion at the bottom, downstream end of the section to allow less than half the operating peeling length of the roller in the second peeling section, the gapped portion allowing the shrimp to drop therethrough and be discharged from the machine to an appropriate means to carry the shrimp away.
Figure 4:
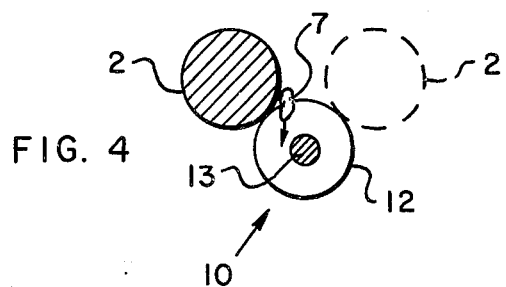
FIG. 4 is an end fragmentary cross-sectional view of the peeling section of the machine of FIG. 3 taken from the perspective of section lines 4—4.

As seen in FIG. 3, the special gapped roller 10 can also be employed to allow less than half the operating peeling length of the standard roller 1 to engage the shrimp so as to prevent over-peeling by reversing the roller 10 end-to-end from the position shown in FIG. 2. When the shrimp reach the gapped portion 11 of the gapped roller 10 at less than half the normal length of the roller, the shrimp 7 fall through the gapped portion 11 and are discharged to an appropriate means such as a flume (not illustrated) to carry the shrimp away from the machine.

As is clear from the foregoing and the drawings, the gapped portion 11 of said roller 10 is of such dimension so as to allow the shrimp being peeled to fall out of the peeling nip of the peeling machine all at the same point. At this point, the shrimp no longer encounter the peeling action of the shrimp peeling machine.

The exemplary gapped roller 10 illustrated in FIGS. 2 and 3 is made of a structure having three, in-line concentric cylindrical portions 12, 13 and 14, two of which are equal in diameter (12,14) and the other (13) having a substantially different and less diameter, the latter forming the gapped portion 11. At both ends of the roller 10 are included identical mounting means 15, 16, allowing the roller 10 to be reversible, end-for-end, for mounting in the two roller dispositions shown in FIGS. 2 and 3, with the gapped portion 11 being located off-center of the full length of the roller 10.

However, the special gapped roller of the present invention can be made in many different forms. For example, the roller could include only two rather than three in-line concentric cylindrical sections by extending the gapped portion all the way to the end of the roller. Additionally, a set of rollers could be provided to each produce different effective lengths of peeling action by for example locating the gapped portion adjacent the upsteam on one (analogous to the roller of FIG. 2), in the center portion on another, and adjacent the downstream end on still another (analogous to the roller of FIG. 3). Alternatively a "universal" gapped roller could be achieved by providing a full length single shaft with a diameter for example of the order of cylindrical portion 13 and a set of varying length sleeves mountable at various locations on the shaft with diameters equal to cylindrical portions 11 and 14, the effective length of peeling action of the "universal" roller being determined by the length of the sleeve(s) used. Also, rather than the gapped portion taking the form illustrated, it could be of a different configuration, the important characteristic being that it be of a size sufficient for shrimp to fall therethrough or, equivalently, not be subject to any significant peeling action between the rollers by falling into the gapped portion out of contact with any further peeling action. Additionally the gapped portion could be jointly formed in both adjacent rollers. The foregoing are just various exemplary changes or embodiments within the scope of the present invention and is certainly not exhaustive of the various possibilities.

In operation, once the desired length or amount of peeling action is determined, for example by observation or trial-and-error, the appropriate gapped roller is selected and appropriately mounted to provide the effective length of peeling action desired. The shrimp progressing through the machine will then be subjected to only the desired length or amount of peeling action and not to peeling action along the full length of the rollers as was the case prior to the present invention.

Because many varying and different embodiments may be made within the scope of the inventive concept herein taught, and because many modifications may be made in the embodiment herein detailed in accordance with the descriptive requirements of the law, it is to be understood that the details herein are to be interpreted as illustrative and not in a limiting sense.

What is claimed as invention is:

1. The method of varying the effective peeling action of a shrimp peeling machine which peels shrimp by the action of at least two regular, mating rollers rotating in alternating, opposite directions forming a peeling section, the shrimp being supported on the rollers and being peeled by the rollers by means of the shells being pinched between the nips of the rollers as the shrimp move down the rollers, comprising the following steps:

a. providing at least one supplemental roller having an initial portion along its length of the same diameter as one of said regular mating rollers and a subsequent gapped portion of a reduced diameter further down along its length of a size sufficient for all the shrimp to fall into without encountering any further peeling action when the shrimp is at said gapped portion to allow all the shrimp being peeled to then fall out of the peeling section and avoid any further peeling action; and b. replacing said one of said regular rollers with said supplemental roller with said initial portion at the upstream end and in peeling engagement with the other of said regular rollers and said gapped portion being out of any peeling engagement with said other regular roller; whereby the effective peeling action of the machine is shortened by means of all of the shrimp falling into said gapped portion rather than being subject to peeling action along the full length of the rollers.

2. The method of claim 1 wherein step (a) a series of gapped rollers is provided, each having a gapped portion located at a different position along its length; and wherein between step (a) and (b) there is included the further step of selecting the appropriate one of said series of gapped rollers to produce the desired length of effective peeling action; and wherein in step (b) the selected one of said series of 3. The method of claim 1 wherein in step (a) the ends of said supplemental roller are provided with identical mounting means whereby the roller is reversible end-for-end and the gapped portion is provided off center of the roller length; and wherein between steps (a) and (b) there is included the further step of selecting the appropriate end of the reversible roller to produce the desired length of effective peeling action; and wherein in step (b) the selected end of the reversible roller is placed in the upstream portion of the shrimp peeling machine.

4. A shrimp peeling machine for peeling shrimp comprising:

a support frame;

at least two mating rollers mounted on said support in mating, face-to-face relationship forming a peeling section at their upstream, initial portions; and drive means for driving the rollers in alternating, opposite directions, the shrimp being supported on the rollers and being peeled by the rollers at their initial portions by means of the shells being pinched between the nips of the rollers as the shrimp move down the initial portions of the rollers; at least one of said rollers having a gapped portion of a reduced diameter further down along its length of a size sufficient for all of the shrimp to fall into without encountering any further peeling action when the shrimp is at said gapped portion to allow all the shrimp being peeled to then fall out of the peeling section and avoid any further peeling action, the roller with said gapped portion being in peeling engagement with the other roller at their initial portions but being out of any peeling engagement with the other roller at said gapped portion; whereby the shrimp are peeled by the rollers only up to the gapped portion rather than being subject to peeling action along the full length of the rollers.

5. The machine of claim 4 wherein the gapped portion is located adjacent the upstream end of the gapped roller.

6. The machine of claim 4 wherein the gapped portion is located at the central portion of the gapped roller.

7. The machine of claim 4 wherein the gapped portion is located adjacent the downstream end of the gapped roller.

8. The machine of claim 4 wherein the gapped roller includes identical mounting means at both its ends, said gapped roller being reversible end-for-end, and said gapped portion is located off-center of the gapped roller.

9. The machine of claim 4 wherein said gapped roller includes at least two, in-line concentric cylindrical portions having substantially different diameters, said gapped portion being formed by the cylindrical portion having the substantially smaller diameter.

* * * * *

UNITED STATES PATENT OFFICE
CERTIFICATE OF CORRECTION

Patent No. 3,971,102          Dated July 27, 1976

Inventor(s)   Raphael Q. Skrmetta,

It is certified that error appears in the above-identified patent and that said Letters Patent are hereby corrected as shown below:

Column "5", line 22, after "of", insert:

--gapped rollers is placed in the shrimp peeling machine.--

Signed and Sealed this

Sixteenth Day of November 1976

[SEAL]

Attest:

RUTH C. MASON
Attesting Officer

C. MARSHALL DANN
Commissioner of Patents and Trademarks